United States Patent [19]

Koch

[11] 4,087,938
[45] May 9, 1978

[54] TREE WATERING DEVICE

[76] Inventor: James Preston Koch, Rte. 8, Box 268-A, Yakima, Wash. 98908

[21] Appl. No.: 779,898

[22] Filed: Mar. 21, 1977

[51] Int. Cl.² .............................................. A01G 29/00
[52] U.S. Cl. .............................. 47/48.5; 239/DIG. 15; 239/302; 239/200
[58] Field of Search ................... 47/27, 30, 32, 33, 59, 47/60, 62, 48.5, 26, 28, 66, 79; 239/63, 65, DIG. 15, 110, 302, 379, 200, 265.19, 273, 285

[56] References Cited

U.S. PATENT DOCUMENTS

| 291,947 | 1/1884 | Skillen | 47/48.5 |
|---|---|---|---|
| 2,784,528 | 3/1957 | Rudenauer | 47/48.5 |
| 2,875,713 | 3/1959 | Shoffner | 47/48.5 X |
| 3,005,287 | 10/1961 | Dudley | 47/48.5 X |
| 3,618,260 | 11/1971 | Convey, Jr. et al. | 47/32 |
| 3,711,992 | 1/1973 | Martin | 47/48.5 |
| 3,755,965 | 9/1973 | Emery | 47/27 |
| 3,755,966 | 9/1973 | Smith | 47/48.5 |
| 3,834,628 | 9/1974 | Selman | 47/48.5 X |
| 3,916,565 | 11/1975 | Runyon | 47/48.5 X |
| 3,961,443 | 6/1976 | Insalaco | 47/32 |

FOREIGN PATENT DOCUMENTS

| 551,758 | 10/1956 | Belgium | 47/32 |
|---|---|---|---|
| 285,783 | 6/1914 | Germany | 47/48.5 |
| 2,031,196 | 1/1972 | Germany | 47/32 |
| 2,118,947 | 1/1973 | Germany | 47/32 |
| 568,513 | 8/1973 | Switzerland | 47/48.5 |
| 790 of | 1890 | United Kingdom | 47/30 |

Primary Examiner—E. H. Eickholt
Attorney, Agent, or Firm—B. P. Fishburne, Jr.

[57] ABSTRACT

Trees, such as fruit bearing trees in drought-stricken areas, are individually watered to conserve the water supply while saving the valuable trees. A radially slotted tub-like irrigator engages around the tree trunk and delivers water in a controlled manner to both the tap roots and the peripheral root network of the tree. No water is wasted and the time span for irrigation can be adjusted. The device is characterized by simplicity and economy of manufacturing and ease of installation.

6 Claims, 6 Drawing Figures

U.S. Patent    May 9, 1978    Sheet 1 of 2    4,087,938
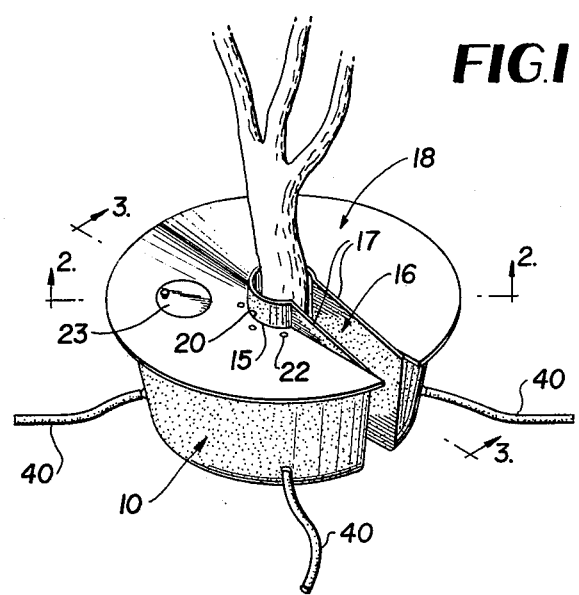
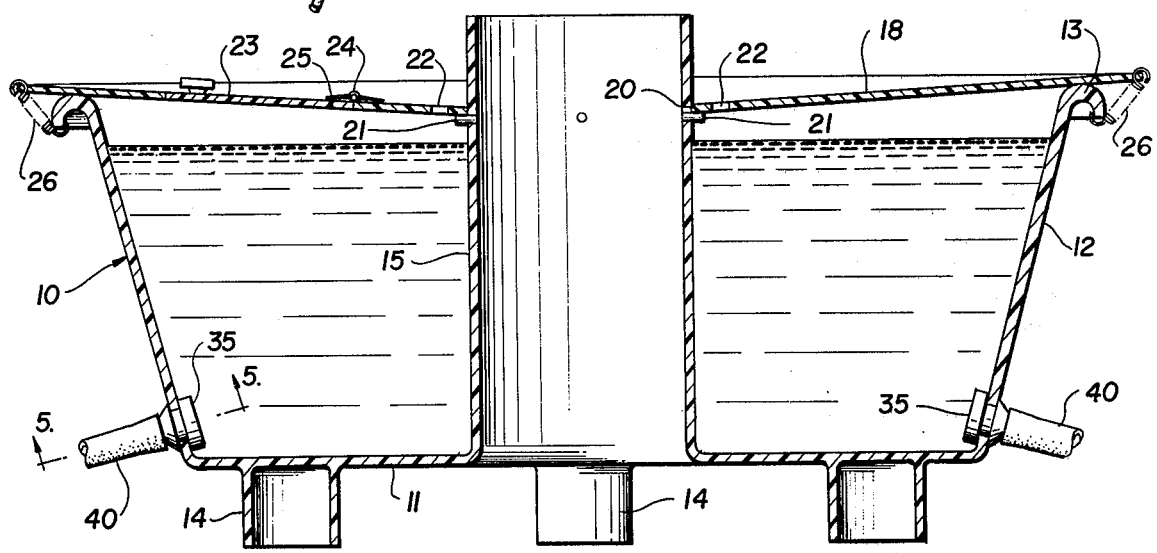
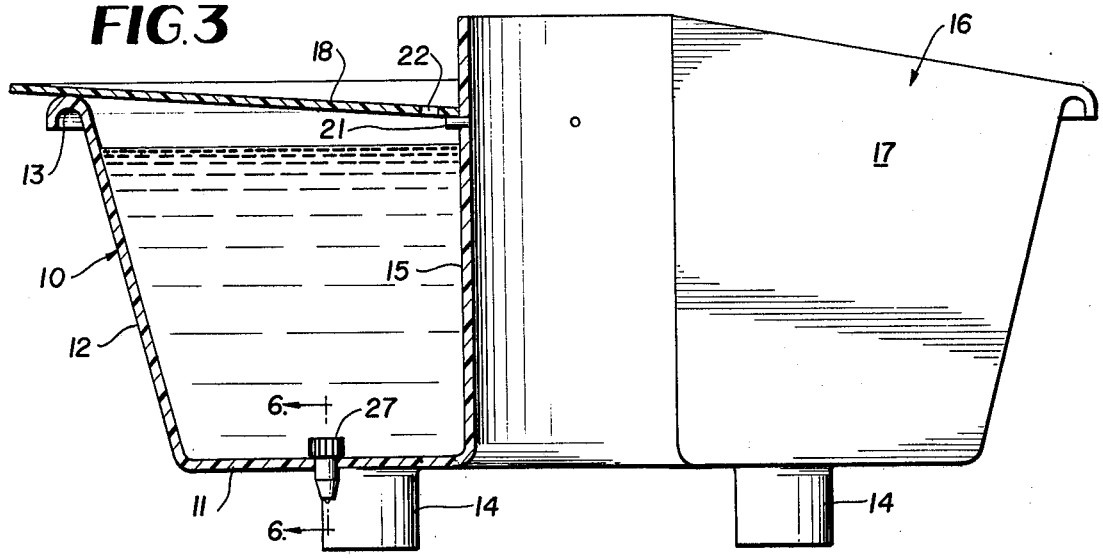

TREE WATERING DEVICE

BACKGROUND OF THE INVENTION

Because of critical and worsening drought conditions in certain areas, such as the Pacific Northwest, there is an urgent need for an economical and practical means to irrigate trees, particularly fruit bearing trees, to prevent their destruction and the resulting great economic loss. To be practical, the tree irrigating or watering means must conserve the dwindling reserves of water in the drought areas and at the same time must be capable of supplying enough water to the trees at least to keep them alive until the end of the drought period.

The objective of this invention, simply stated, is to satisfy the above urgent need in terms of a simple, economical and practical water conserving irrigator for individual trees which has the capacity to supply significant amounts of water to trees in a controlled and efficient manner without wasting any water and by delivering water only to those parts of trees where watering is necessary.

Portable tree and plant watering devices, broadly speaking, are known in the prior art but no such known devices have proven adequate to satisfy the needs created by the present drought situation in terms of water conservation, practicality of manufacturing of the irrigation means, and delivering enough water to trees over a long enough period of time to save the trees and maintain their health. Some examples of the prior patented art are contained in U.S. Pat. Nos. 419,242; 584,886; 1,029,107; 2,105,800; 2,145,934; 2,784,528; 3,005,287 and 3,461,606.

SUMMARY OF THE INVENTION

A portable individual tree watering device embodies a radially slotted annular tub-like reservoir adapted to surround a tree trunk and having a central upstanding cylindrical wall forming a protector and supporting means for the trunk. A preferably dished or concave removable lid for the reservoir is provided which can funnel rain water into the reservoir. The lid has a preferably hinged single filler cap. The reservoir is equipped with short bottom support legs which elevate the tub body a few inches from ground level. A trickle valve device in the bottom wall of the tub body delivers water in a controlled and variable manner to center or tap roots of trees while plural marginal trickle valves, equipped with tube extensions, deliver water to the peripheral roots. The device can be constructed from a variety of economical materials including pressed aluminum, styrofoam, molded plastics, fiberglass, rubber-like materials, and water-proofed cardboard.

Other features and advantages of the invention will become apparent during the course of the following detailed description.

BRIEF DESCRIPTION OF THE DRAWINGS

FIG. 1 is a perspective view of a tree watering device embodying the invention.

FIG. 2 is a central vertical section through the device taken on line 2—2 of FIG. 1.

FIG. 3 is a similar section taken on line 3—3 of FIG. 1.

DETAILED DESCRIPTION

Figure 4:
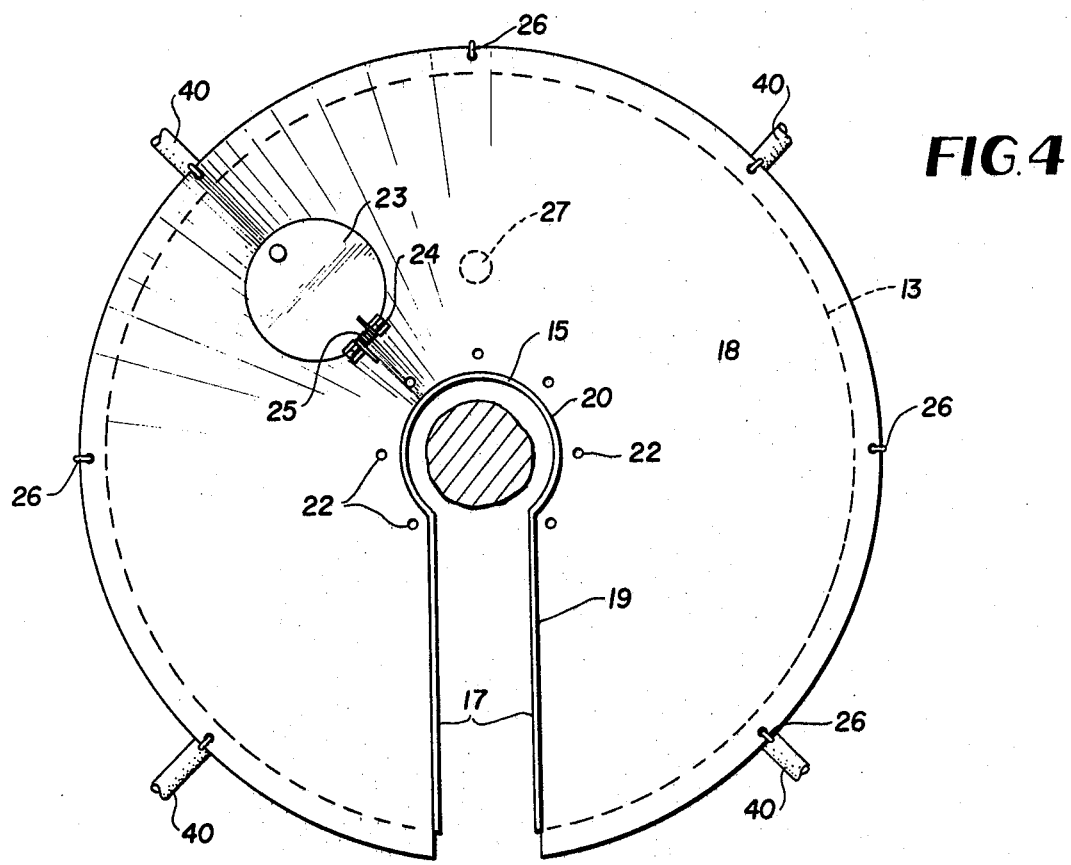
FIG. 4 is a plan view of the device.

Referring to the drawings in detail wherein like numerals designate like parts, a tree watering device embodying the invention comprises a tub or reservoir 10 of annular form whose size and capacity may vary according to the type and size of tree requiring irrigation. The tub 10 is preferably unitary in construction as when molded from fiberglass reinforced material and includes a flat bottom wall 11, an upwardly conically flaring side wall 12 and a top marginal reinforcing and lifting flange 13.

The tub has preferably four equidistantly spaced short legs 14 depending from its bottom wall to position the bottom wall 2 or more inches above ground level. A center upstanding cylindrical wall 15 or sleeve rises from the bottom wall 11 of the tub and is open-ended, as shown. The upper end of the sleeve 15 projects somewhat above the open top of the tub 10.

The tub has a radial slot 16 formed through the side wall 12 and through the center sleeve 15 and this slot has spaced parallel vertical side walls 17 extending between and joining the tub side wall 12 and the side wall of sleeve 15 where the slot is formed. As shown in FIGS. 1 and 3, the slot side walls 17 extend to the upper end of the center sleeve 15. As the parts are integrally formed, the fluid integrity of the tub 10 is maintained. The radial slot 16 extends entirely through the tree watering device from top-to-bottom thereof.

The device additionally comprises a preferably slightly dished or concave lid 18 of somewhat larger diameter than the tub 10 so that the lid, when placed on the upper flange 13, will project radially outwardly of the flange 13, such as 1 inch, more-or-less. The lid 18 is circular and has a radial slot 19 for registration with the slot 16. The parallel edges of the lid slot 19, FIGS. 1 and 4, lie immediately outside of the walls 17 and therefore these walls serve to locate and stabilize the lid circumferentially when it is applied to the tub 10.

The lid has a central circular opening 20 formed therethrough and adapted to engage snugly around the upstanding sleeve 15 of the tub. Preferably, the tub sleeve 15 has two or more small support lugs 21 for the central portion of the lid projecting radially from the sleeve 15 somewhat below the top of the sleeve, as shown in FIG. 2.

The concave lid 18 may be provided near its center with a plurality of small apertures 22 for conducting rain water which may collect on the concave lid into the tub 10. In lieu of the apertures 22, a small space for this purpose can be provided between the sleeve 15 and the edge of the lid opening 20.

The lid has a single water filler cap 23 hinged at 24 to the body of the lid and biased to a closed position by a spring 25 associated with the hinge. To prevent displacement of the lid 18 by wind forces and resulting loss of water from the tub, a plurality such as seven lid hold-down springs 26 are provided around the periphery of the device. Suitable spring retaining apertures are formed in the lid and in the tub flange 13, as depicted in FIG. 2. The springs 26 are arranged for easy separation from the flange 13.

To supply water in a controlled manner to the tap roots of a tree, a vertical axis adjustable trickle valve 27 is mounted in an opening of the tub bottom wall 11 between the sleeve 15 and tub side wall 12. This trickle valve has a threaded stem 28 carrying a tapered flow metering pin 29 which is adjustable vertically in relation to a bottom outlet port 30 of an outer threaded valve body 31 secured within a bottom wall opening 32 of the tub. The adjusting or turning knob 33 of the trickle valve has a strainer element 34 therein to keep debris out of the adjustable trickle valve. By adjusting the valve 27, water flow from the tub 10 to the tap roots can be controlled and the time period for irrigation can be widely regulated to satisfy the needs of a particular situation.

Figure 5:
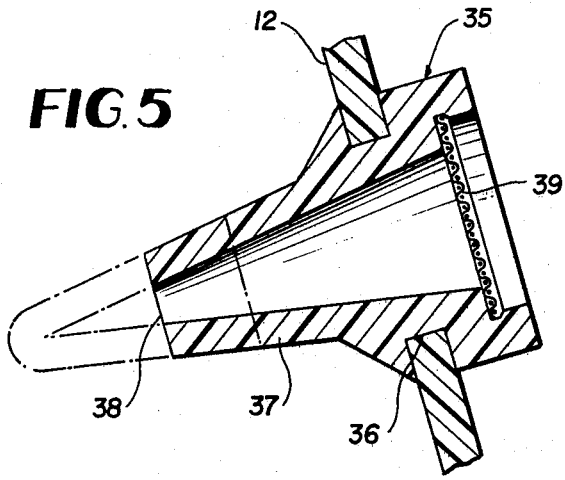
FIG. 5 is an enlarged cross section taken through a trickle valve on line 5—5 of FIG. 3.
Figure 6:
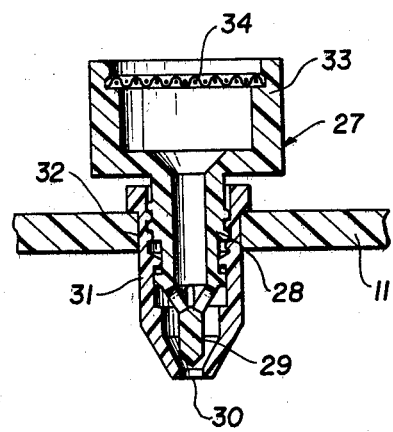
FIG. 6 is an enlarged cross section through another form of trickle valve taken on line 6—6 of FIG. 3.

For delivering water to peripheral tree roots well outwardly of the tree trunk, additional trickle valves 35, preferably numbering four, are mounted in openings 36 of the tub side wall 12 about one-half inch above the bottom wall 11 in circumferentially equidistantly spaced relation. The trickle valves 35 are of a one-piece type having a conical tubular body 37 which may be cut off at various points or lengths, such as at 38 in FIG. 5, to provide the desired degree of water flow. Once so cut, the valves 35 cannot have their flows reduced any further. Each valve 35 also has a strainer element 39.

Preferably, the side wall trickle valves 35 have extension tubes 40 of any required length removably telescoped thereover, so that water can be delivered at a desirable rate of flow to exactly the points in the outer root network of the tree where it will do the most good.

In this connection, the system does not waste any water on parts of the tree which do not require irrigation, such as on the bark of the tree trunk or the center of the rows. Instead, the water is delivered in a controlled manner to the most productive areas and every drop of water in the tub is efficiently used with an extreme reduction in the amount of water necessary to irrigate trees compared to conventional practice.

In some cases, the side wall trickle valves 35 may be used in lieu of the threaded valve 27 on the bottom wall 11 of the tub and likewise the valve 27 could be used at the side wall location of each valve 35.

Preferably, the tub 10 is colored dull black to absorb the sun's rays and heat while the center sleeve 15 is shiny white as is the entire lid 18. The white sleeve 15 provides a sunshade for young trees and the heat build-up caused by the black tub during the summer months will discourage the nesting of mice in and around the base of the tree. The heat reflective qualities of the white lid will also retard water evaporation in the tub.

The device has other advantages or fringe benefits. Its use controls weed and grass growth around the bases of trees in the area covered by the tub. Ground water evaporation is lessened. Dew condensation on the bottom of the tub 10 is recaptured and returned to the soil by dripping. Some frost protection is provided by the device. Ground temperature is increased around the tree which stimulates growth. The water reservoir absorbs and retains heat from the sun and retards evening temperature drop and resulting tree damage. The tubes 40 may contain soluble chemicals and act as a slow release device for same. The device restricts animals from digging or attacking the base of the tree. Rodent control pellets may be placed beneath the tub 10 and children or pets do not have easy access to the poison.

The watering device is installed merely by passing the tree trunk through the slot 16 until the trunk is centered in the upstanding sleeve 15. The tub is then filled with water after raising the cap 23 and adjusting the trickle valves to the desired flow. The irrigating process can be adjusted at the trickle valves to last for only a few minutes at a steady flow or for several hours at a slow dripping rate.

The advantages of the invention should now be apparent without the need for further discussion. The device accomplishes two major things. It drastically reduces irrigation water and therefore conserves water and it maintains tree life during the drought period.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A tree watering device comprising a watering tub of substantially annular form adapted to rest on the ground at the base of a tree in surrounding relationship to the tree trunk, said tub having a generally radial slot extending from top to bottom thereof by means of which said tub may be placed around a tree trunk, adjustable water metering valve means on said tub near its bottom by means of which water can be delivered at a controlled rate to selected tree root areas, said tub having a bottom wall and an upwardly flaring side wall and a center upstanding sleeve rising from the bottom wall of the annular tub, a pair of radial substantially vertical walls joining the tub side wall with said center sleeve and defining therewith a generally radial slot, a concave lid resting on the open top of said tub and having a center opening adapted to fit over and surround said sleeve and a radial slot adapted to register with the tub radial slot, said tub being colored black to absorb heat and said lid and upstanding sleeve being white and reflective.

2. A tree watering device as defined in claim 1, and comparatively short support legs on the bottom of said tub maintaining the tub bottom wall slightly elevated from the ground.

3. A tree watering device as defined in claim 1, and said tub, center upstanding sleeve and vertical walls being molded as a unit from synthetic material.

4. A tree watering device as defined in claim 1, and said metering valve means comprising plural circumferentially spaced flexible tubes connected into the tub side wall near and above the tub bottom wall and being selectively extendable to various locations of a tree root network radially beyond the tub.

5. A tree watering device comprising a unitary open top tub of substantially annular form formed from moldable material, said tub having a bottom wall, a side wall and a central upstanding sleeve rising from the bottom wall and being open ended, said sleeve extending somewhat above the top of the side wall, the sleeve, tub side wall and tub bottom wall being radially slotted, a pair of spaced substantially parallel vertical walls joining the slotted edges of the sleeve and tub side wall with the slotted edges of the tub bottom wall and forming a radial passage through which a tree trunk may enter said sleeve with said tub resting on the ground surrounding the tree trunk, plural circumferentially spaced radial irrigation tubes connected with said tub near the tub bottom wall, and a disc-like lid of somewhat wider diameter than the tub adapted to rest on the top edge of the tub side wall and projecting somewhat outwardly of said top edge and being concave and being provided with a radial slot from its center through its periphery, and said slot receiving therein the upper end portion of said sleeve and top edge portions of said vertical walls, whereby the lid is positioned on the tub and held against rotation, the sleeve and vertical walls extending somewhat above the concave portion of the lid.

6. A tree watering device as defined in claim 5, and the lid having drain openings for rain formed therethrough near and in surrounding relation to the sleeve, and fixed support elements on the sleeve at circumferentially spaced points engageable beneath the center portion of the lid.

* * * * *